United States Patent
Song et al.

(10) Patent No.: US 11,225,203 B2
(45) Date of Patent: Jan. 18, 2022

(54) HOLDER FOR VEHICLE

(71) Applicants: Bang Won Song, Seoul (KR); Hyun Sook Kim, Seoul (KR)

(72) Inventors: Bang Won Song, Seoul (KR); Hyun Sook Kim, Seoul (KR)

( * ) Notice: Subject to any disclaimer, the term of this patent is extended or adjusted under 35 U.S.C. 154(b) by 870 days.

(21) Appl. No.: 16/067,533

(22) PCT Filed: Dec. 6, 2016

(86) PCT No.: PCT/KR2016/014252
§ 371 (c)(1),
(2) Date: Jun. 29, 2018

(87) PCT Pub. No.: WO2017/116030
PCT Pub. Date: Jul. 6, 2017

(65) Prior Publication Data
US 2021/0206327 A1   Jul. 8, 2021

(30) Foreign Application Priority Data

Dec. 30, 2015 (KR) .......................... 10-2015-0190014

(51) Int. Cl.
*B60R 11/02* (2006.01)
*B60R 11/00* (2006.01)

(52) U.S. Cl.
CPC ... *B60R 11/0241* (2013.01); *B60R 2011/0008* (2013.01); *B60R 2011/0059* (2013.01); *B60R 2011/0071* (2013.01); *B60R 2011/0084* (2013.01)

(58) Field of Classification Search
CPC ......... B60R 11/0241; B60R 2011/0008; B60R 2011/0059; B60R 2011/0071; B60R 2011/0084; F16B 2/10; Y10S 224/929

USPC ... 248/229.13, 229.23, 228.4, 231.51, 316.5; 224/929

See application file for complete search history.

(56) References Cited

U.S. PATENT DOCUMENTS

| 4,702,447 | A | * | 10/1987 | Westwood, III | ........ B63B 21/46 24/598.5 |
| 5,096,150 | A | * | 3/1992 | Westwood | ............... B63B 21/46 248/231.51 |
| 6,926,242 | B2 | * | 8/2005 | Hall | ........................ B25B 5/103 224/420 |

(Continued)

FOREIGN PATENT DOCUMENTS

KR 10-1566660 B1 11/2015
WO WO-2009147514 A2 * 12/2009 ............. B60R 11/02

*Primary Examiner* — Scott T McNurlen
(74) *Attorney, Agent, or Firm* — Maschoff Brennan

(57) ABSTRACT

A holder for a vehicle holds various portable devices, such as cell phones and IT goods, by being firmly fixed to a grille of an air blowing hole by enabling four fixing bars to mechanically rotate according to the forward and backward movement of a pressurizing member such that one ends of the four fixing bars gather together or are separated from each other. The holder includes a housing having a through hole formed in the center of a front plate and four fixing bars. Each fixing bar has one end which protrudes to the front surface of the housing through the through hole so that the four fixing bars are inserted into a blowing hole and are supported on an air blowing hole grille, and another end having an arm that outwardly curves so that one side thereof is rotatably coupled to the inside of the front plate.

15 Claims, 6 Drawing Sheets

(56) References Cited

U.S. PATENT DOCUMENTS

| | | |
|---|---|---|
| 9,004,331 B2 * | 4/2015 | Fan .................. B60R 11/02 224/483 |
| 9,586,530 B2 | 3/2017 | Kim |
| 2013/0146632 A1 | 6/2013 | Lai |
| 2014/0097306 A1 | 4/2014 | Hale et al. |
| 2014/0103087 A1 | 4/2014 | Fan |
| 2014/0138419 A1 | 5/2014 | Minn et al. |
| 2015/0069197 A1 | 3/2015 | Mitchell |

\* cited by examiner

[FIG. 1]
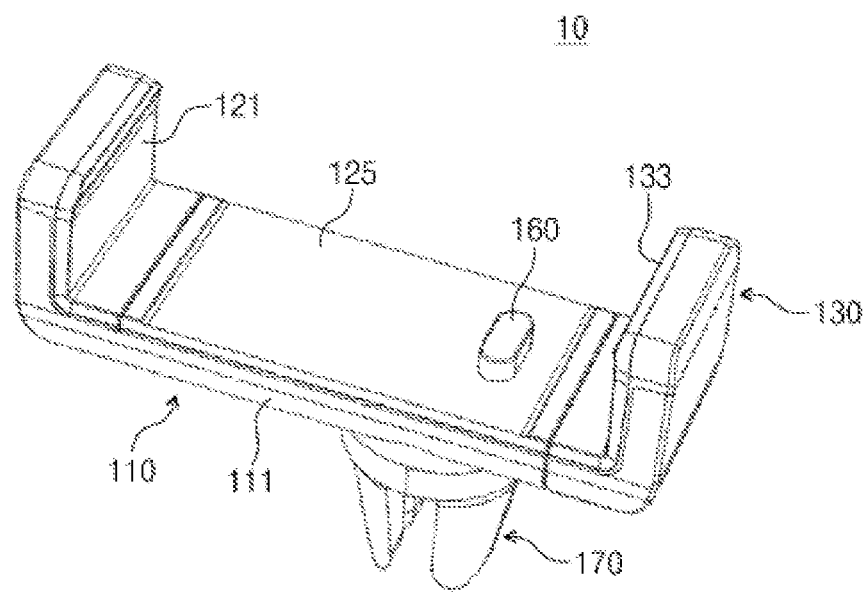
[FIG. 2]
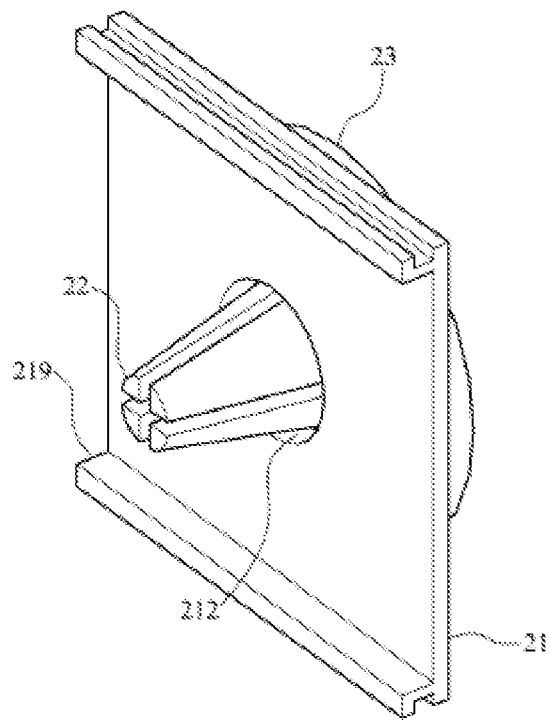

[FIG. 3]
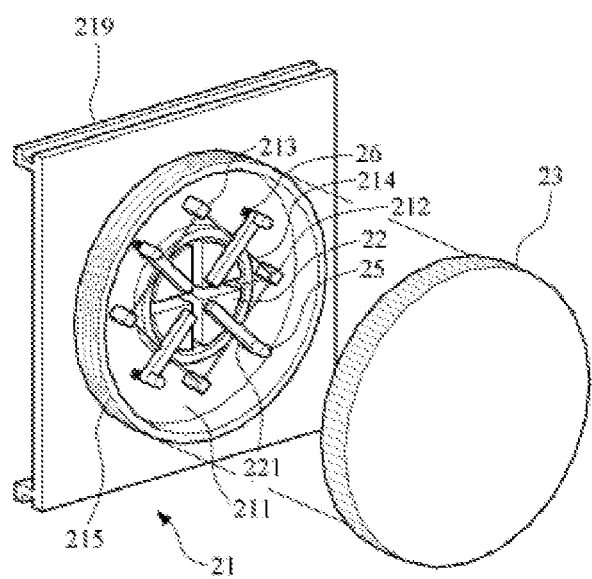

[FIG. 4]
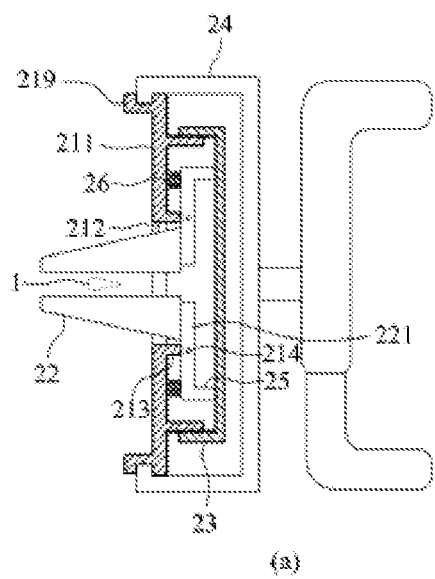
(a)
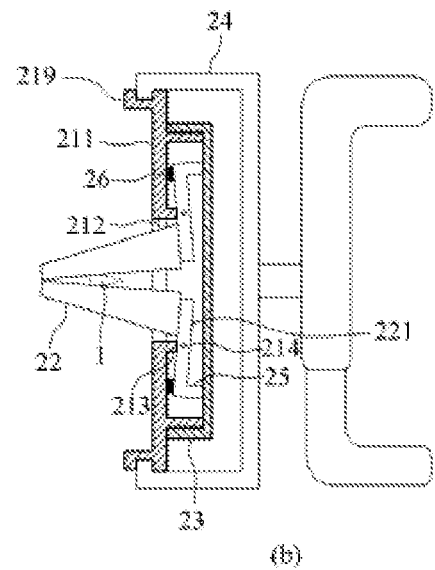
(b)

[FIG. 5]
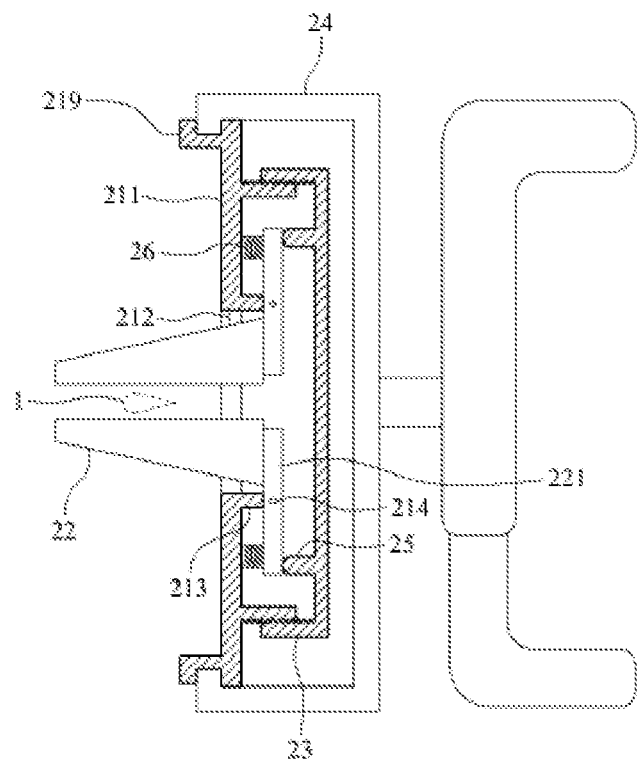
[FIG. 6]
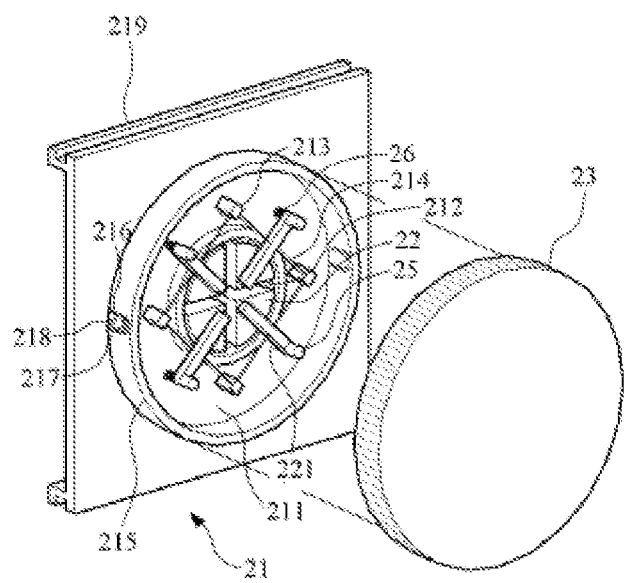

[FIG. 7]
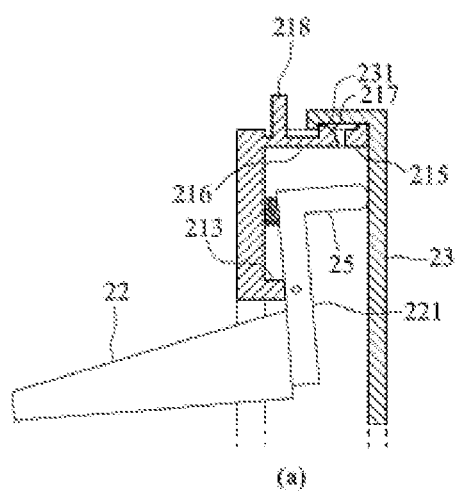
(a)
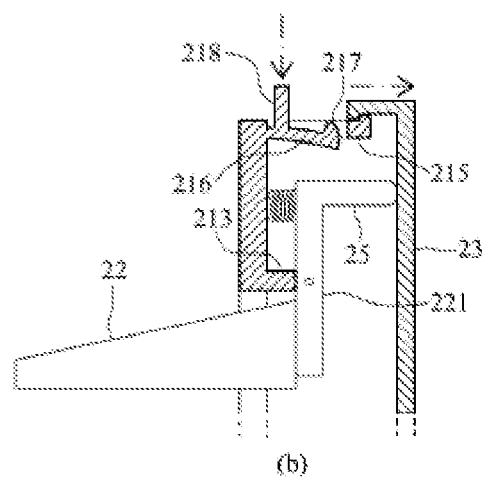
(b)

[FIG. 8]
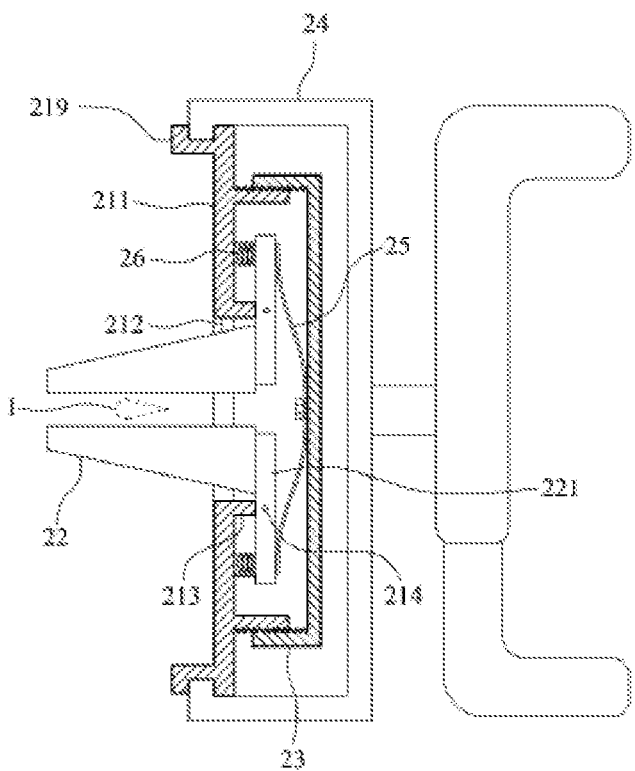
[FIG. 9]
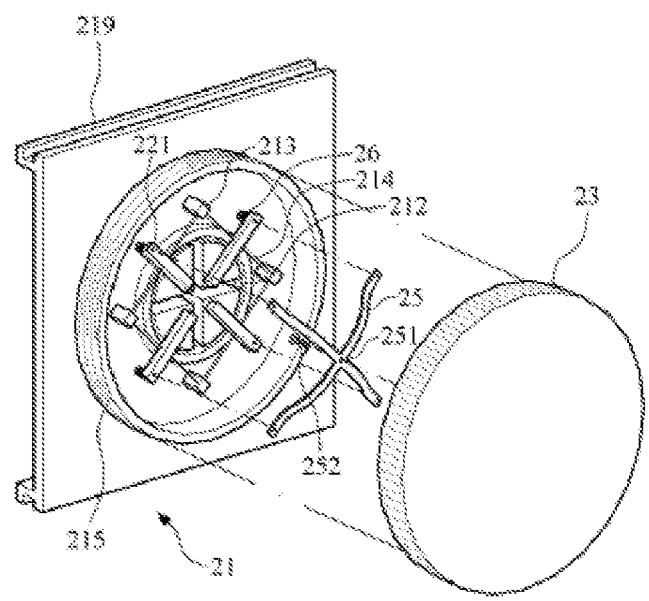

HOLDER FOR VEHICLE

TECHNICAL FIELD

The present invention relates to a holder for a vehicle, which can be firmly fixed to a grille of an air blowing hole so as to stably hold various portable devices, such as a cell phone, an IT good etc. by enabling four fixing bars to mechanically rotate according to the forward and backward movements of a pressurizing member such that one ends of the four fixing bars gather together or are separated from each other.

RELATED ART

Almost all sorts of vehicles have an air blowing hole at their front surfaces or rear surfaces. An air blowing hole is the right place to hold various portable devices, such as a cell phone, an IT good etc. by means of a grille positioned at its front surface.

Accordingly, different kinds of holders for vehicles have been developed such that various portable devices may be held at air blowing holes.

A conventional clip-type holder is fixed to an air blowing hole, in which a clip to which a portable device is coupled is fixed to a grille of the air blowing hole.

However, a portable device is not firmly fixed to the clip of the conventional holder. Accordingly, the clip often hangs downwards or falls out because of the weight of the portable device. In addition, when the portable device is attached to or detached from the clip, the clip often falls out.

Further, an apparatus for holding a portable device has been developed, in which four picking up legs 170 are fitted into and fixed to an air blowing hole as illustrated in FIG. 1 (Patent No. 10-1566660).

However, the apparatus for holding a portable device can easily fall out when a portable device is attached or detached because the apparatus for holding a portable device is fixed to an air blowing hole only by means of elasticity of the four picking up legs 120. Further, the apparatus often falls out because of the weight of a portable device.

DETAILED DESCRIPTION OF THE INVENTION

Technical Problems

As a means to solve the above-described problems, the present invention provides a holder for a vehicle, which is inserted into a vehicle air blowing hole so as to be firmly fixed to the grille of the air blowing hole.

Technical Solutions

The present invention according to a preferred embodiment provides a holder for a vehicle including: a housing having a through hole formed in the center of a front plate; four fixing bars, each of the four fixing bars having one end which protrudes from the front surface of the housing through the through hole so that the four fixing bars are inserted into a vehicle air blowing hole and are supported on an air blowing hole grille and the other end which has arms that curve outwards so that one side thereof is rotatably coupled to the inside of the front plate of the housing; a pressurizing member which is coupled to the rear surface of the housing so as to move in forward and backward directions; and a holding part which is detachably coupled to the housing in order to fix a portable device, wherein a pressurizing part is formed on the rear side of an outer end of the arm or on the front surface of the pressurizing member such that as the pressurizing member moves forward, the pressurizing part pressurizes the arms and the fixing bars are rotated.

The present invention according to another preferred embodiment provides a holder for a vehicle, wherein supporting bars are formed at the rear surface of the front plate around the through hole and configured to protrude between the arms of each of the fixing bars, and hinge pins are coupled between adjacent supporting bars such that one sides of the arms are hinge-coupled to the hinge pins.

The present invention according to another preferred embodiment provides a holder for a vehicle, wherein a lateral plate of the housing has a cylinder shape with a screw thread on the outer circumference thereof, and the pressurizing member is screwed to the outside of the lateral plate of the housing so as to move forward and backward according to rotation.

The present invention according to another preferred embodiment provides a holder for a vehicle, wherein both sides of the lateral plate of the housing are cut in a ⊏ shape so as to connect the front surface with the lateral surface plate, the rear surface of the lateral plate is configured to have elastic stumbling parts where stumbling protrusions protrude outwards, and the inner circumferential surface of the lateral surface of the pressurizing member is configured to have a fixing part where the stumbling protrusions of the elastic stumbling parts selectively stumble to fix the position of the pressurizing member.

The present invention according to another preferred embodiment provides a holder for a vehicle, wherein stumble releasing protrusion parts are formed to protrude from the outer side of the front surface of the elastic stumbling parts.

The present invention according to another preferred embodiment provides a holder for a vehicle, wherein elastic members are provided between outer ends of the arms and the front plate.

The present invention according to another preferred embodiment provides a holder for a vehicle, wherein the pressurizing part coupled to the front surface of the pressurizing member has curvature which curves outwards in the rear direction and has a + shape such that each end of the pressurizing part is configured to be a plate spring so as to pressurize the outer ends of the arms.

Advantageous Effects

The effects of the present invention will be described as follows.

First, a holder for a vehicle is fixed to a grille of an air blowing hole regardless of shapes, sizes etc. of the air blowing hole by enabling four fixing bars to mechanically rotate according to the forward and backward movements of a pressurizing member such that one ends of the four fixing bars gather together or are separated from each other to form a slant angle with respect to the grille of the air blowing hole. Accordingly, the holder for a vehicle can be firmly fixed to the grille of the air blowing hole so as not to escape outwards.

Second, a holder for a vehicle of the present invention can be fixed to a grille of an air blowing hole regardless of shapes, sizes etc. of the air blowing hole, and fixing bars 22 are firmly fixed around a point where the horizontal grille and the vertical grille of the grille of a vehicle air blowing hole meet so as to fix the holder for a vehicle to the air blowing hole.

Third, if elastic members are provided between the outer ends of the arms and a front plate, the elastic members pressurize the arms in the state where pressurizing members move backward such that one ends of the fixing bars protruding may be kept separated. Accordingly, the holder for a vehicle is readily inserted into or separated from the air blowing hole.

Fourth, if a pressurizing part is configured to be a plate spring, although the pressurizing member excessively moves forward, one ends of the fixing bars are not overloaded by means of elasticity of the pressurizing part.

Fifth, the holder for a vehicle may be selectively installed such that the grille of the air blowing hole still functions as a device for ventilation.

BRIEF DESCRIPTION OF THE INVENTION

FIG. 1 is a perspective view illustrating a conventional holder for a vehicle.

FIG. 2 is a perspective view illustrating a holder for a vehicle of the present invention.

FIG. 3 is a perspective view illustrating the coupling of a holder for a vehicle according to an embodiment of the present invention.

FIG. 4 is a sectional view illustrating the operation of the holder for a vehicle of the present invention illustrated in FIG. 3.

FIG. 5 is a sectional view illustrating a holder for a vehicle of the present invention with a pressurizing part on the front of a pressurizing member.

FIG. 6 is a perspective view illustrating the coupling of a holder for a vehicle according to another embodiment of the present invention.

FIG. 7 is a sectional view illustrating the operation of the holder for a vehicle of the present invention illustrated in FIG. 6.

FIG. 8 is a sectional view illustrating a holder for a vehicle of the present invention in which a pressurizing part is configured to be a plate spring.

FIG. 9 is a perspective view illustrating the coupling of the holder for a vehicle of the present invention illustrated in FIG. 8.

BEST MODE FOR CARRYING OUT THE INVENTION

As a means to achieve the above-described purposes, the present invention is characterized in that a holder for a vehicle of the present invention includes: a housing having a through hole formed in the center of a front plate; four fixing bars, each of the four fixing bars having one end which protrudes from the front surface of the housing through the through hole so that the four fixing bars are inserted into a vehicle air blowing hole and are supported on an air blowing hole grille and the other end which has arms that curve outwards so that one side thereof is rotatably coupled to the inside of the front plate of the housing; a pressurizing member which is coupled to the rear surface of the housing so as to move in forward and backward directions; and a holding part which is detachably coupled to the housing in order to fix a portable device, wherein a pressurizing part is formed on the rear side of an outer end of the arm or on the front surface of the pressurizing member such that as the pressurizing member moves forward, the pressurizing part pressurizes the arms and the fixing bars are rotated.

MODE FOR CARRYING OUT THE INVENTION

Below, the present invention will be described in detail with reference to the attached drawings and preferred embodiments.

FIG. 2 is a perspective view illustrating a holder for a vehicle of the present invention, FIG. 3 is a perspective view illustrating the coupling of a holder for a vehicle according to an embodiment of the present invention, and FIG. 4 is a sectional view illustrating the operation of the holder for a vehicle of the present invention illustrated in FIG. 3.

As illustrated in FIGS. 2 and 4, a holder for a vehicle of the present invention includes: a housing 21 having a through hole 212 formed in the center of a front plate 211; four fixing bars 22, each of the four fixing bars having one end which protrudes from the front surface of the housing 21 through the through hole 212 so that the four fixing bars 22 are inserted into a vehicle air blowing hole and are supported on an air blowing hole grille 1 and the other end which has arms 221 that curve outwards so that one side thereof is rotatably coupled to the inside of the front plate 211 of the housing 21; a pressurizing member 23 which is coupled to the rear surface of the housing 21 so as to move in forward and backward directions; and a holding part 24 which is detachably coupled to the housing 21 in order to fix a portable device, wherein a pressurizing part 25 is formed on the rear side of an outer end of the arm 221 or on the front surface of the pressurizing member 23 such that as the pressurizing member 23 moves forward, the pressurizing part 25 pressurizes the arms 221 and the fixing bars 22 are rotated.

The housing 21, which is positioned at the front surface of a vehicle air blowing hole, has a through hole 212 which is formed in the center of a front plate 211 and through which fixing bars 22 penetrate.

The fixing bars 22 have one end which protrudes from the front surface of the housing 21 through the through hole 212 so that the fixing bars 22 are inserted into a vehicle air blowing hole and are supported on an air blowing hole grille 1. One ends of the four fixing bars 22 may be configured to gather together.

The four fixing bars 22 are regularly spaced apart from one another such that the four fixing bars are arranged symmetrically in the up, down, left and right directions.

The fixing bars 22 has the other end which has arms 221 that curve outwards and are rotatably coupled to the inside of the front plate 211 of the housing 21.

In sectional views such as FIGS. 4, 5 etc., the fixing bars 22 has arms 221 that perpendicularly curve so as to have a ¬ shape as a whole.

Additionally, the arm 221 is configured to rotate around a hinge pin 214 that will be described hereunder.

The four fixing bars 22 may be formed by equally dividing a circular truncated cone which has one end and the other end with different diameters into four pieces, placing the four pieces apart from one another, and coupling the arms 221 to each of the other ends.

The outsides of the fixing bars 22 are coated with a silicone tube etc. to prevent any flaws or breakages of a vehicle air blowing hole.

The pressurizing member 23 is coupled to the rear surface of the housing 21 so as to move in forward and backward directions.

As the pressurizing member 23 moves forward, the pressurizing part 25, formed on the rear side of an outer end of the arm 221 or on the front surface of the pressurizing member 23, pressurizes the arms 221. Accordingly, one ends of the four fixing bars 22 gather together while the rotation angle of the four fixing bars 22 changes.

That is, as the pressurizing member 23 moves forward, the pressurizing member 23 pressurizes the pressurizing part 25 so as to pressurize the arms 221 of a fixing part 231. Accordingly, the arms 221 rotate around the pressurizing part 25, and one ends of the four fixing bars 22 inserted into the vehicle air blowing hole gather together such that the fixing bars 22 are firmly fixed around a point where the horizontal grille and the vertical grille of the grille 1 of the vehicle air blowing hole meet. As a result, the holder for a vehicle does not escape outwards.

The holding part 24 is detachably coupled to the housing 21 in order to fix a portable device.

A part of the holding part 24, to which the portable device is fixed, may be configured to be controllable in size, according to the width or length of the portable device. Accordingly, both ends of the portable device are pressurized to fix the portable device.

According to various embodiments, the holding part 24 may be coupled to the housing 21. However, groove-shaped insertion parts 219 may be formed at both ends of the front plate 211 of the housing 21 like the embodiments illustrated in FIG. 4 etc., and a protrusion part formed at the front end of the E-shaped holding part 24 in the perpendicular direction is inserted into the insertion part 219 so as to fix the holding part 24 to the housing 21.

FIGS. 3 and 4 illustrate an arm 221 with a pressurizing part 25 formed at on the rear side of an outer end of the arm 221.

Hereunder, the operation of a holder for a vehicle of the present invention will be described with reference to FIG. 4.

FIG. 4A illustrates a state where the four fixing bars 22 are spaced apart from one another, and the holder for a vehicle is inserted into the vehicle air blowing hole such that a point where the horizontal grille and the vertical grille of the grille 1 of the vehicle air blowing hole meet is positioned among the four fixing bars 22.

Then, as the pressurizing member 23 moves forward, outer ends of the arms 221 of the fixing bars 22 are pressurized, the fixing bars 22 rotate, and the ends of the four fixing bars 22 gather together such that the holder for a vehicle is firmly fixed to the grille 1 of the vehicle air blowing hole.

As illustrated in FIGS. 3, 4 etc., supporting bars 213 are formed at the rear surface of the front plate 211 around the through hole 212 and configured to protrude between the arms 221 of each of the fixing bars 22, and hinge pins 214 are coupled between adjacent supporting bars such that one sides of the arms 221 are hinge-coupled to the hinge pins 214.

The supporting bars 213 protrude between the arms 221 of adjacent fixing bars 22 and in FIGS. 3, 6 etc., are positioned respectively between four adjacent fixing bars 22. Accordingly, four supporting bars 213 are formed to protrude from the rear surface of the front plate 211.

Herein, the hinge pins 214 coupled between adjacent supporting bars are coupled to the arms 221 such that the arms 221 are a little spaced apart from the front plate 211.

Accordingly, the fixing bars 22 may rotate freely by means of the pressure exerted by the pressurizing member 23.

As illustrated in FIGS. 3 to 5, a lateral plate 215 of the housing 21 has a cylinder shape with a screw thread on the outer circumference thereof, and the pressurizing member 23 is screwed to the outside of the lateral plate 215 of the housing 21 so as to move forward and backward according to rotation.

The pressurizing member 23 may pressurize a pressurizing part 25 through various methods.

In particular, as illustrated in FIGS. 3 to 5, a cylinder-shaped lateral plate 215 of the housing 21 has a screw thread on the outer circumferential surface of the lateral plate, and the pressurizing member 23 is tightened by rotating along the screw thread the lateral plate 215 of the housing 21. Accordingly, as the pressurizing member 23 moves forward, the pressurizing part 25 pressurizes the arms 221, and the fixing bars 22 rotate such that one ends of the fixing bars 22 gather together and are fixed.

As illustrated in FIGS. 3 to 9, an elastic member 26 may be provided between the outer end of the arm 221 and the front plate 211.

As illustrated in FIGS. 4A, 7B etc., the elastic members 26 pressurize the arms 221 of the fixing bars 22 in the state where the pressurizing member 23 moves backward. Accordingly, one ends of the fixing bars 22 protruding from the front of the housing 21 may be kept apart such that the holder for a vehicle is readily inserted into or released from the grille 1 of the vehicle air blowing hole.

In particular, as illustrated in FIG. 7A that will be described below, when a stumbling protrusion 217 of the housing 21 and the fixing part 231 of the pressurizing member mutually stumble and remain pressurized, if stumble releasing protrusion parts 218 are pressed, the pressurizing part 25 pushes the pressurizing member 23 backward by means of elasticity of the elastic member 26 so as to release the stumbling protrusion and the fixing part from the state of being pressurized.

The elastic member 26 may be provided to each of the arms 221, and also, one coil spring may be configured to be an elastic member 26 to support all the four arms 221.

FIG. 5 is a sectional view illustrating a holder for a vehicle of the present invention with a pressurizing part on the front of a pressurizing member.

As illustrated in FIGS. 3 and 4, the pressurizing part 25 may be formed on the rear side of an outer end of the arm 221.

Further, as illustrated in FIG. 5, the pressurizing part 25 may be configured to protrude from the front surface of the pressurizing member 23.

In this case, the pressurizing part 25 is preferably configured to protrude in the shape of a ring so as to pressurize the arms 221 regardless of rotation of the pressurizing member 23.

FIG. 6 is a perspective view illustrating the coupling of a holder for a vehicle according to another embodiment of the present invention, and FIG. 7 is a sectional view illustrating the operation of the holder for a vehicle of the present invention illustrated in FIG. 6.

As illustrated in FIGS. 6 and 7, both sides of the lateral plate 215 the housing 21 are cut in a ⊏ shape so as to connect the front surface with the lateral surface plate, the rear surface of the lateral plate may be configured to have elastic stumbling parts 216 where stumbling protrusions 217 protrude outwards, and the inner circumferential surface of the lateral surface of the pressurizing member 23 may be configured to have a fixing part 231 where the stumbling protrusions 217 of the elastic stumbling parts 216 selectively stumble to fix the position of the pressurizing member 23.

While FIGS. 3 and 4 illustrate a case where the pressurizing member 23 pressurizes the arms 221 by means of the screw coupling of the lateral plate 215 and the housing 21 and the pressurizing member 23, FIGS. 6 and 7 illustrate a case where the pressurizing member 23 pressurizes the arms 221 by means of the mutual stumbling of the stumbling protrusions 217 of the housing 21 and the fixing part 23 of the pressurizing member 23.

When the pressurizing member 23 is pushed, the fixing bars 22 rotate and one ends of the fixing bars 22 gather together. In this case, the stumbling protrusions 217 of the housing 21 stumble over the fixing part 231 of the pressurizing member 23 such that the fixing bars 22 maintain the state where the fixing bars gather together and are firmly supported by and fixed to the grille 1 of the vehicle air blowing hole.

In this case, a shape of the lateral plate 215 of the housing 21 is not limited to a cylinder.

Herein, stumble releasing protrusion parts 218 may be formed to protrude from the outer side of the front surface of the elastic stumbling parts 216.

As illustrated in FIG. 7B, if the stumble releasing protrusion parts 218 are pressed inwardly to remove the holder for a vehicle from the grille 1 of the vehicle air blowing hole, the elastic stumbling parts 216 are pressed such that the stumbling protrusions 217 stumbling over the fixing part 231 of the pressurizing member 23 escape from the fixing part 231 and are released from fixation. The pressurizing member 23 moves backward by means of elasticity of the elastic member 26 such that the fixing bar 22 is released from the gill 1 of the vehicle air blowing hole.

The operational relation among the stumbling protrusions 217 and the stumble releasing protrusion parts 218 of the elastic stumbling parts 216, and the fixing part 23 of the pressurizing member 23 will be described as follows with reference to FIG. 7.

That is, FIG. 7A illustrates a state where as the pressurizing member 23 moves forward, the fixing part 231 stumbles over the stumbling protrusions 217, and the pressurizing part 25 pressurizes the arms 221 such that the fixing bars 22 are fixed in the state where the fixing bars 22 gather together.

Additionally, FIG. 7B illustrates a state where the stumble releasing protrusion parts 218 are pressed so as to release the stumbling protrusions 217 of the fixing part 231 from fixation. The holder for a vehicle may be removed from the grille 1 of the vehicle air blowing hole in the state where one ends of the fixing bars 22 are separated from each other.

FIG. 8 is a sectional view illustrating a holder for a vehicle of the present invention in which a pressurizing part is configured to be a plate spring, and FIG. 9 is a perspective view illustrating the coupling of the holder for a vehicle of the present invention illustrated in FIG. 8.

As illustrated in FIGS. 8 and 9, the pressurizing part 25 coupled to the front surface of the pressurizing member 23 has curvature which curves outwards in the rear direction and has a + shape such that each end of the pressurizing part 25 is configured to be a plate spring so as to pressurize the outer ends of the arms 221.

The pressurizing part 25 may consist of protrusion parts formed at the rear side of the outer ends of the arms 221 as illustrated in FIGS. 3 and 4, or formed at protrusion parts formed at the front surface of the pressurizing member 23 as illustrated in FIG. 5.

Besides, the pressurizing part 25 may be configured to be a plate spring coupled to the front surface of the pressurizing member 23.

In particular, if the pressurizing part is configured to be a +-shaped plate spring having curvature which curves outwards in the rear direction, the center of the plate spring is positioned at the center of the front surface of the pressurizing member 23.

Accordingly, as the pressurizing member 23 moves forward, when the pressurizing member 23 pressurizes the center of the plate spring—i.e. pressurizing part 25, four ends of the plate spring respectively pressurize the outer end of each arm 221, and the fixing bars 22 rotate such that one ends of the fixing bars gather together and the fixing bars 22 are firmly fixed to the grille 1 of the vehicle air blowing hole.

In this case, although the pressurizing member 23 excessively moves forward, one ends of the fixing bars 22 are not overloaded by means of elasticity of the pressurizing part 25 that is a plate spring.

Meanwhile, if the pressurizing member 23 is screwed to the housing 21, rotation forces of the pressurizing member 23 must not be transferred to the pressurizing part 25. That is, although the pressurizing member 23 rotates, the pressurizing part 25, a plate spring, must not rotate.

To this end, a through hole 251 is formed at the center of the plate spring-shaped pressurizing part 25, and a coupling member 252 such as a bolt or a screw etc. penetrates through the through hole 251 from the pressurizing part 25 so as to be fixed to the front surface of the pressurizing member 23.

In this case, if there is a small gap left between the head part of a bolt or a screw and the pressurizing part 25, it is more effective in that forward and backward movements of the pressurizing member 23 are transferred to the pressurizing part 25 but rotation forces of the pressurizing member 23 are not transferred to the pressurizing part 25.

INDUSTRIAL APPLICABILITY

The present invention is industrially applicable in providing a holder for a vehicle, which can be firmly fixed to a grille of an air blowing hole regardless of shapes, sizes etc. of the air blowing hole by enabling four fixing bars to mechanically rotate according to the forward and backward movements of a pressurizing member such that one ends of the four fixing bars gather together or are separated from each other to form a slant angle with respect to the grille of the air blowing hole.

The invention claimed is:

1. A holder for a vehicle comprising:
a housing having a through hole formed in the center of a front plate;
four fixing bars, each of the four fixing bars having one end which protrudes from the front surface of the housing through the through hole so that the four fixing bars are inserted into a vehicle air blowing hole and are supported on a grille of the air blowing hole and the other end which has arms that curves outwards so that one side thereof is rotatably coupled to the inside of the front plate of the housing;
a pressurizing member which is coupled to the rear surface of the housing so as to move in forward and backward directions; and
a holding part which is detachably coupled to the housing in order to fix a portable device,
wherein a pressurizing part is formed on the rear side of an outer end of the arm or on the front surface of the pressurizing member such that as the pressurizing member moves forward, the pressurizing part pressurizes the arms and the fixing bars are rotated.

2. The holder for a vehicle according to claim 1, wherein:
supporting bars are formed at the rear surface of the front plate around the through hole and configured to protrude between the arms of each of the fixing bars, and
hinge pins are coupled between adjacent supporting bars such that one sides of the arms are hinge-coupled to the hinge pins.

3. The holder for a vehicle according to claim 2, wherein elastic members are provided between outer ends of the arms and the front plate.

4. The holder for a vehicle according to claim 2, wherein the pressurizing part coupled to the front surface of the pressurizing member has curvature which curves outwards in the rear direction and has a + shape such that each end of the pressurizing part is configured to be a plate spring so as to pressurize the outer ends of the arms.

5. The holder for a vehicle according to claim 1, wherein:
a lateral plate of the housing has a cylinder shape with a screw thread on the outer circumference thereof, and
the pressurizing member is screwed to the outside of the lateral plate of the housing so as to move forward and backward according to rotation.

6. The holder for a vehicle according to claim 5, wherein elastic members are provided between outer ends of the arms and the front plate.

7. The holder for a vehicle according to claim 5, wherein the pressurizing part coupled to the front surface of the pressurizing member has curvature which curves outwards in the rear direction and has a + shape such that each end of the pressurizing part is configured to be a plate spring so as to pressurize the outer ends of the arms.

8. The holder for a vehicle according to claim 1, wherein:
the rear surface of a lateral plate of the housing has elastic stumbling parts where stumbling protrusions protrude outwards, and
the inner circumferential surface of the lateral surface of the pressurizing member has a fixing part where the stumbling protrusions of the elastic stumbling parts selectively stumble to fix the position of the pressurizing member.

9. The holder for a vehicle according to claim 8, wherein elastic members are provided between outer ends of the arms and the front plate.

10. The holder for a vehicle according to claim 8, wherein the pressurizing part coupled to the front surface of the pressurizing member has curvature which curves outwards in the rear direction and has a + shape such that each end of the pressurizing part is configured to be a plate spring so as to pressurize the outer ends of the arms.

11. The holder for a vehicle according to claim 8, wherein stumble releasing protrusion parts are formed to protrude from the outer side of the front surface of the elastic stumbling parts).

12. The holder for a vehicle according to claim 11, wherein elastic members are provided between outer ends of the arms and the front plate.

13. The holder for a vehicle according to claim 11, wherein the pressurizing part coupled to the front surface of the pressurizing member has curvature which curves outwards in the rear direction and has a + shape such that each end of the pressurizing part is configured to be a plate spring so as to pressurize the outer ends of the arms.

14. The holder for a vehicle according to claim 1, wherein elastic members are provided between outer ends of the arms and the front plate.

15. The holder for a vehicle according to claim 1, wherein the pressurizing part coupled to the front surface of the pressurizing member has curvature which curves outwards in the rear direction and has a + shape such that each end of the pressurizing part is configured to be a plate spring so as to pressurize the outer ends of the arms.

\* \* \* \* \*